US008812995B1

(12) United States Patent
Murphy

(10) Patent No.: US 8,812,995 B1
(45) Date of Patent: Aug. 19, 2014

(54) SYSTEM AND METHOD FOR DISAMBIGUATING ITEM SELECTION

(71) Applicant: Google Inc., Mountain View, CA (US)

(72) Inventor: Bruce W. Murphy, Pyrmont (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/860,384

(22) Filed: Apr. 10, 2013

(51) Int. Cl.
*G06F 3/0482* (2013.01)
(52) U.S. Cl.
CPC ................................. *G06F 3/0482* (2013.01)
USPC ............ 715/863; 715/864; 715/810; 715/764
(58) Field of Classification Search
CPC .............................. G06F 3/0482; G06F 3/016
USPC .................... 715/810, 764, 863, 864
See application file for complete search history.

(56) References Cited

U.S. PATENT DOCUMENTS

| | | | |
|---|---|---|---|
| 7,336,279 B1 | 2/2008 | Takiguchi | |
| 7,692,629 B2 | 4/2010 | Baudisch et al. | |
| 8,044,937 B2 | 10/2011 | Shin et al. | |
| 8,074,178 B2 | 12/2011 | Hudson | |
| 8,487,957 B1 | 7/2013 | Bailly et al. | |
| 2005/0132301 A1* | 6/2005 | Ikeda ............................ | 715/812 |
| 2006/0161846 A1 | 7/2006 | Van Leeuwen | |
| 2007/0028269 A1* | 2/2007 | Nezu et al. ....................... | 725/52 |
| 2007/0115373 A1 | 5/2007 | Gallagher et al. | |
| 2010/0235779 A1* | 9/2010 | Maeda et al. ................. | 715/781 |
| 2010/0251176 A1 | 9/2010 | Fong et al. | |
| 2010/0306702 A1 | 12/2010 | Warner | |
| 2012/0035932 A1* | 2/2012 | Jitkoff et al. .................. | 704/254 |
| 2012/0304061 A1 | 11/2012 | Hoover et al. | |

OTHER PUBLICATIONS

"100 iPad Tips and Tricks," (2010). Retrieved from the Internet on Nov. 7, 2013: URL:http://ukmug.pbworks.com/f/100+iPad+Tips+and+Tricks.pdf.
Google Developers, "Too Many Markers!," (2013). Retrieved from the Internet on Nov. 7, 2013: URL:https://developers.google.com/maps/articles/toomanymarkers.
Snavely et al., "Photo Tourism: Exploring Photo Collections in 3D," (2006). Retrieved from the Internet on Apr. 28, 2014: URL:http://phototour.cs.washington.edu/Photo_Tourism.pdf.
U.S. Appl. No. 12/129,501, filed on May 29, 2008.

* cited by examiner

*Primary Examiner* — Andrea Leggett
(74) *Attorney, Agent, or Firm* — Marshall, Gerstein & Borun LLP

(57) ABSTRACT

A software module provides multiple individually selectable items via a user interface. The software module detects a contact with an area on the user interface that includes several of the individually selectable items in a first relative arrangement. The software module determines that the contact corresponds to an attempted selection of a single item. The software module provides a disambiguation menu for selecting the single item from among the several individually selectable items within the area, and arranges the several individually selectable items in the disambiguation menu according to a second relative arrangement different from the first relative arrangement.

22 Claims, 5 Drawing Sheets

SYSTEM AND METHOD FOR DISAMBIGUATING ITEM SELECTION

FIELD OF THE DISCLOSURE

The present disclosure relates to user interfaces and, more particularly, to providing an interface for selecting an item from among several items closely clustered together on a screen.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including portable devices such as mobile phones and hand-held global positioning system (GPS) units, support software applications that display interactive digital maps. Many of these computing devices are equipped with a touchscreen via which users may interact with the digital maps. For example, a user may "drag" the viewport to a new location, double-tap to zoom in on a location, etc. Further, the user may submit a geographic search query and, in response, the software application may place selectable markers at locations on the digital map corresponding to the results of the search query. The user then may tap on the marker to view additional information pertaining to the location.

However, because screen real estate may be limited (particularly in portable devices), the software application may display multiple markers so closely together on the touchscreen that it is difficult for the user to accurately select the desired marker with his or her finger. In particular, the area of contact with the user's finger may include several markers, and the software application cannot determine with certainty which of the several markers the user intended to select. Although the software application may, for example, determine the centroid of the contact area and select the marker closest to the centroid, the marker selected in this manner is not always the one the user intended to select.

SUMMARY

A software application displays multiple individually selectable items so closely together on a touchscreen or another suitable interface that, when a user attempts to place her finger on the desired item, the finger covers an area that includes more than one item. To help the user resolve this ambiguity, the software application generates a disambiguation menu via which the user can select the desired item. The user then can select the desired item using the disambiguation menu.

More particularly, according to an example implementation, a method is implemented in a computing device for disambiguating selections of selectable items via a user interface. The method includes providing multiple individually selectable items via the user interface. The method further includes detecting a contact with an area on the user interface in which several of the individually selectable items are provided according to a first relative arrangement, and determining that the contact corresponds to an attempted selection of a single item. The method also includes providing a disambiguation menu for selecting the single item from among the several individually selectable items within the area, including arranging the several individually selectable items in the disambiguation menu according to a second relative arrangement different from the first relative arrangement.

According to another example implementation, a computing device includes one or more processors, a user interface, and a computer-readable medium storing instructions. When executed on one or more processors, the instructions cause the computing device to (i) detect an attempted selection of an item via the user interface, including detect an interaction with a contact area in which several selectable items are displayed, (ii) automatically spread the several selectable items over a larger area on the touch interface than the contact area, including change a position of at least one of the plurality of selectable items relative to the other ones of the plurality of selectable items, and (iii) receive a selection of one of the several plurality of selectable items via the user interface.

According to yet another implementation, a method for disambiguating selections of markers overlaying a digital map of a geographic area is implemented in a computing device having a touchscreen. The method includes causing individually selectable geographic markers to be displayed over the digital map, such that each geographic marker is associated with a respective location within the geographic area, and where each geographic marker is displayed at a point on the digital map corresponding to the location with which the geographic marker is associated. The method further includes detecting an instance of user contact with the touchscreen at a contact area that includes multiple displayed geographic markers. Still further, the method includes determining that the instance of user contact indicates an attempted selection of exactly one of the geographic markers and automatically providing, via the touchscreen, a disambiguation menu for selecting a geographic marker from among the geographic markers included in the contact area. In particular, providing the disambiguation menu includes causing the indicators corresponding to the respective geographic markers to be displayed over the digital map in an area larger than the contact area, at points different that the points at which the geographic markers are displayed. The method also includes receiving a selection of one of the geographic markers via the disambiguation menu.

According to yet another implementation, a computing device includes a means for providing multiple individually selectable items via the user interface. The computing device also includes a means for detecting a contact with an area on the user interface in which several of the individually selectable items are provided according to a first relative arrangement, and a means for determining that the contact corresponds to an attempted selection of a single item. The computing device further includes a means for providing a disambiguation menu for selecting the single item from among the several individually selectable items within the area, including arranging the several individually selectable items in the disambiguation menu according to a second relative arrangement different from the first relative arrangement.

DETAILED DESCRIPTION

Generally speaking, a software module can use the techniques of the present disclosure to determine which one of several selectable items clustered closely together on a screen the user wishes to select by tapping on, long-pressing on, or otherwise pointing at, the cluster. When the software module receives an indication that the user selected an area of the screen that includes multiple selectable items, the software module generates a disambiguation menu for selecting an item from among the multiple items in the selected area. As discussed in more detail below, the positioning of items in the disambiguation menu need not be related to the positioning of items in the selected area. In other words, rather than simply enlarging the area of the screen in which the selectable items are positioned, the software module can arrange the selectable items so as to make the selection process efficient and intuitive.

Example techniques for disambiguating item selection are discussed below with reference to a mapping software module that provides an interactive digital map on a touchscreen device. The selectable items in the example scenarios are geographic markers displayed over a digital map in response to a query (e.g., "where can I get pizza in downtown Chicago?"), and the user attempts to select one of the markers to see additional information related to the particular search result (e.g., phone number, hours of operation). It is noted, however, that these techniques can be used in mapping applications with any suitable interactive markers, icons, indicators, etc. Further, these techniques can be utilized in other types of software applications in which selectable items are provided via a user interface. Still further, these techniques need not be limited to finger gestures applied a touchscreen, and can also be used with stylus operations, three-dimensional gestures, etc.

System Overview

Figure 1:
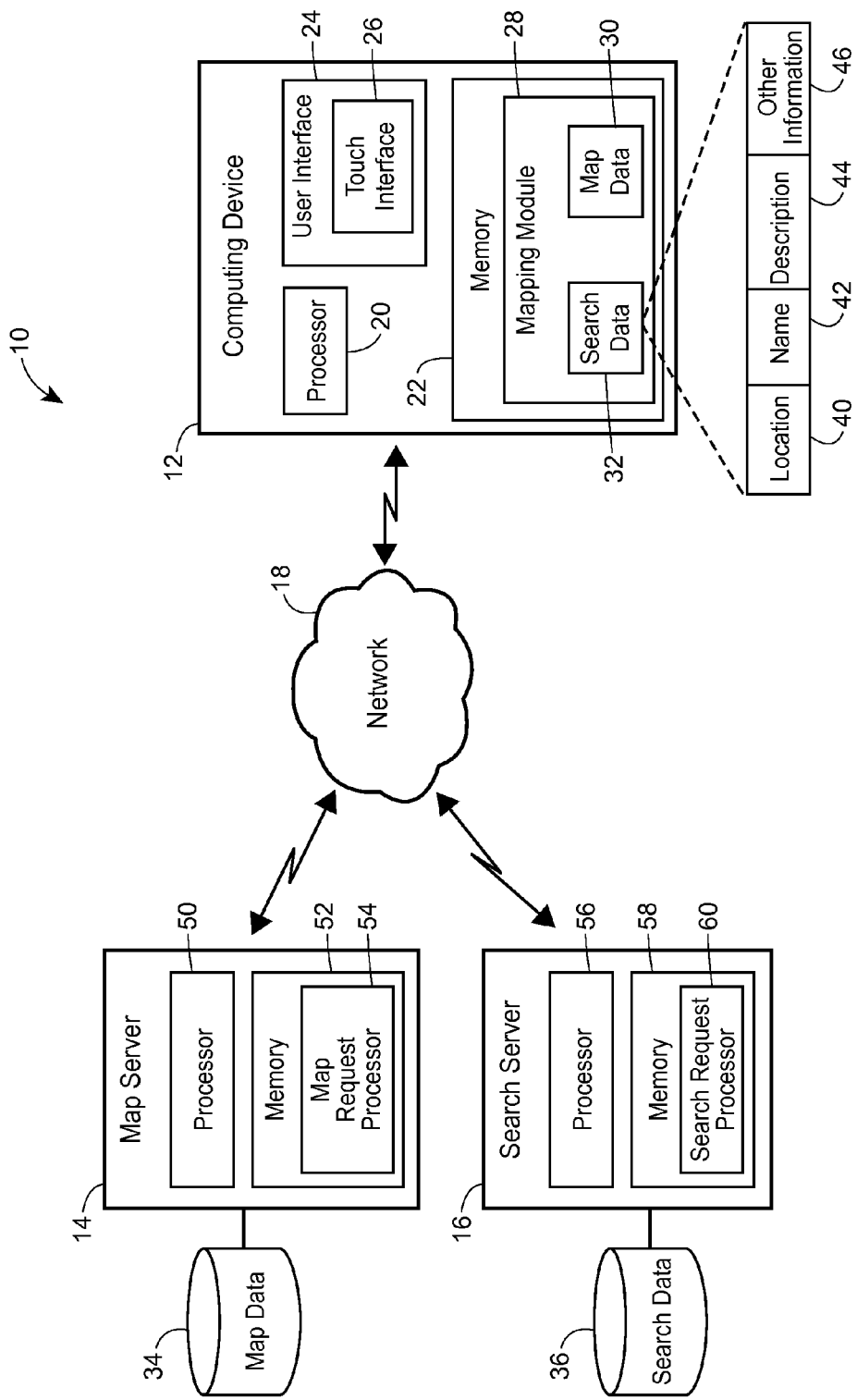
FIG. 1 is a block diagram of an example system in which techniques for interactively disambiguating selections of markers are implemented.

Referring first to FIG. 1, a system 10 includes an example computing device 12 that implements at least some of the disambiguation techniques of the present disclosure. The computing device 12 is coupled to a map server 14 and a search server 16 via a communication network 18 that can include wired and/or wireless links. The computing device 12 can be, for example, a smartphone, a tablet computer, a personal digital assistant, a navigation device mounted in a vehicle, or even a desktop computer.

In the implementation illustrated in FIG. 1, the computing device 12 includes one or more processors 20 such as central processing units (CPUs), a computer-readable memory 22, and a user interface 24 including a touch interface or touchscreen 26. More generally, the computing device 12 can include one or more processors and, if desired, one or more graphics processing units (GPUs) as well as other processing units. The memory 22 can be a computer-readable, tangible, non-transitory storage device and can include both persistent (e.g., a hard disk, a flash drive) and non-persistent (e.g., RAM) memory components. The memory 22 stores instructions executable on the processor 20 that make up a mapping software module 28. In this example configuration, the memory 22 also stores map data 30 and search data 32 on which the mapping module 28 operates.

The mapping software module 28 according to various implementations is a separately executable software application, a plugin or an extension that provides additional functionality to another software application such as a web browser, etc. The instructions that make up the mapping module 28 may be compiled and executable on the processor 20 directly, or not compiled and interpreted by another software application at runtime.

In operation, the mapping module 28 generates requests for map data in accordance with how the user positions the viewport using pan, zoom, and other controls. A request for map data can specify, for example, the geographic area for which the computing device 12 will display a digital map, the zoom level, the desired layers of additional information (e.g., traffic, weather, satellite imagery, etc.). The computing device 12 transmits the requests to the map server 14. In response, the map server 14 retrieves map data from a map database 34 and provides the map data to the computing device 12 via the network 18 in any suitable format (e.g., raster, vector graphics). The computing device 12 then stores the received map data in the memory 22 as the map data 30. The mapping software module 28 generates a digital map using the map data 30 and, when necessary, requests new map data in response to user input (e.g., pan operations, zoom operations) received via the user interface 24.

When interacting with the digital map, the user may enter search queries to find certain places in the geographic area displayed on the map. For example, the user may submit search queries to locate restaurants, retail stores, banks, hotels, gas stations, etc. The search queries may be general in nature such as a search for every restaurant in the geographic area if the user is interested in visiting a restaurant. The search queries also may be more specific, such as a search for a particular bank or stores that sell a certain product in the geographic area. In any event, the mapping module 28 formats a search query, transmits the search query to the search server 16, receives the search data 32, and overlays markers representing the search results on the map at the corresponding locations. For example, the markers can represent the locations of individual restaurants.

For simplicity, the search server 16 is depicted in FIG. 1 as being coupled to a search database 36. It will be understood, however, that the system 10 can include a number of search servers as well as multiple databases storing various types of data.

The search data 32 includes results for a search query. For example, if the user enters a search query to locate restaurants in a geographic area, the search data may include the name and location of a certain number of restaurants within that geographic area. Search data may include non-graphics content such as text as well as graphics content such as photographic images. In the implementation illustrated in FIG. 1, the search data 32 is in the form of a list that includes a location field 40 (e.g., specifying the latitude and longitude of the place), a name field 42 (specifying the name of the place), a description field 44 (specifying, for example, the category of the place), and other information field 46 (specifying such information as operating hours, postal addresses, telephone numbers, restaurant photos, links to the restaurant websites, customer reviews, etc.). More generally, the search data 32 can include any suitable number of fields.

With continued reference to FIG. 1, the map server 14 may include a processor 50 and a memory 52 that stores a map request processor 54, made up of instructions executable on the processor 50. The search server 16 similarly may include a processor 56 and a memory 58 that stores a search request processor 60, made up of instructions executable on the processor 56. According to various implementations, the map server 14 and/or the search server 16 include one or multiple devices, operate in a distributed or non-distributed manner, are owned by single business entity or different business entities, etc. For the purposes of this discussion, the term "map server" refers to an individual map server device or to a group of two or more map server devices. Similarly, the term "search server" refers to an individual search server device or to a group of two or more search server devices.

Disambiguating Selections of Geographic Markers on a Digital Map

The mapping software module 28 places markers on the map in accordance with the search data 32. More particularly, the mapping software module 28 overlays markers on the digital map at positions corresponding to the geographic locations of the corresponding search results, so that if the response to the query "what are the restaurants in this area with the best reviews?" identifies a restaurant at the corner of Main Street and First Street, for example, the mapping software module 28 displays a marker where the digital map illustrates the corner of Main Street and First Street. Such markers have any suitable shape, color, and level of detail.

Figure 2A:
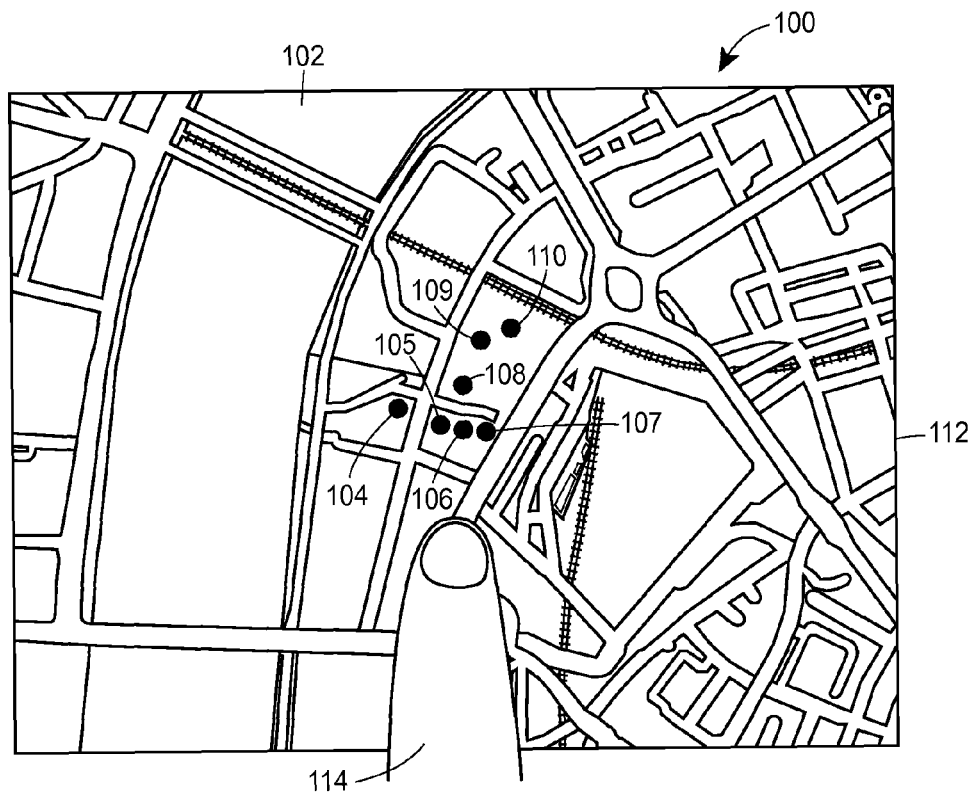
FIG. 2A is an example screenshot which a mapping module can generate to display markers positioned closely together at the center of a touchscreen.

Depending on the current zoom level, the mapping software module 28 may show multiple markers so closely together on the touchscreen 26 that it can be difficult for the user to accurately select the desired marker with his finger. For example, screenshot 100 in FIG. 2A illustrates a digital map of a geographic area 102, which is overlaid with markers 104-110 positioned near the center of the touchscreen 112. The markers 104-110 in this example are small circles filled with a single color.

Figure 2B:
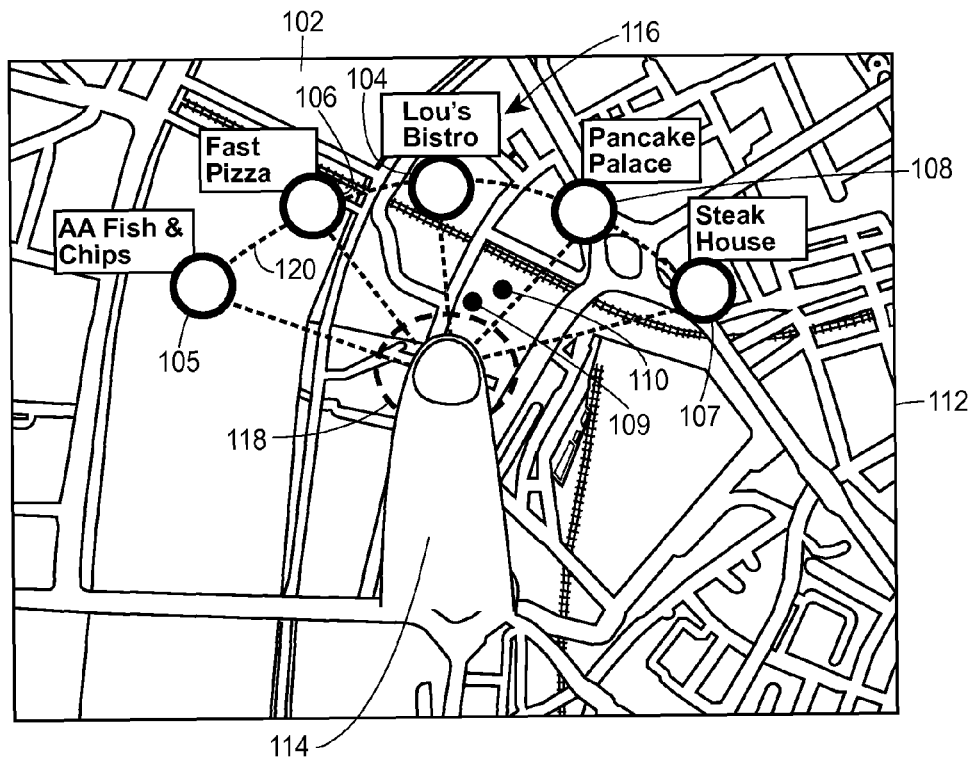
FIG. 2B is an example screenshot which the mapping application can generate to display a disambiguation menu for selecting one of the markers of FIG. 2A.

A user attempts to select a marker from among the markers 104-110 by long-pressing with her finger 114 on the area of the touchscreen 112 where the markers 104-110 are displayed, according to an example scenario. However, because the markers 104-110 are displayed closely together, the area of contact between the finger 114 and the touchscreen 112 includes more than one of these markers. In FIG. 2B, this area of contact is illustrated as being within an imaginary boundary 118 (not actually displayed on the touchscreen 112).

To resolve this ambiguity, the mapping module 28 generates a disambiguation menu 116 which allows the user 114 to easily and efficiently select the desired marker, as illustrated in FIG. 2B. Because the markers 104-108 are within the boundary 118 while markers 109 and 110 are outside the boundary 118, the disambiguation menu 116 includes markers 104-108 but does not include marker 109 or marker 110. The mapping module 28 spreads the markers 104-108 along an arc 120. The markers 104-108 thus are temporarily positioned over the digital map according to a new relative arrangement that no longer reflects the actual locations to which the markers 104-108 correspond.

Depending on the implementation and/or the number of items in the disambiguation menu 116, the arc 120 can take up most of the space of the touchscreen 112 or only a small portion of the space. The center of the arc 120 can approximately correspond to the centroid of the area of contact within the imaginary boundary 118. The arc 120 may be positioned above the area of contact with the touchscreen 112 as defined by the orientation of the computing device 12 to simplify the selection process (otherwise, the user's finger or hand may obscure the disambiguation menu 116). However, in some cases the arc 120 may be "tilted," as discussed below.

The relative arrangement of the spread-out markers 104-108 on the arc 120 need not be identical, or even similar, to the original relative arrangement of the markers 104-108 on the digital map 102. For example, in the scenario of FIG. 2B, the markers 104-108 are arranged from left to right along the arc 120 according to the names of the restaurants in alphabetical order. In other implementations, the order of markers 104-108 on the arc 120 can reflect the popularity of the corresponding locations, the relevance of the corresponding locations to the search query, the likelihood that the user intended to select the corresponding location (determined in view of one or more signals), or otherwise according to how high or low the profile of the search result is. More generally, the markers 104-108 can be arranged on the arc 120 according to any suitable principle. Further, depending on the user's language settings, the markers 104-108 can be arranged from left to right or right to left.

Alternatively to arranging the markers 104-108 along the arc 120 according to an order of importance, or in addition to arranging markers in this manner, the more important ones of the markers 104-108 can be highlighted. As another alternative, the more important ones of the markers 104-108 can be displayed along the arc 120, while the less important ones can be made accessible by selecting a "more results" indicator on the arc 120 (not shown). The "more results" indicator, if used, may always be displayed in the same position on the arc 120 to make the disambiguation menu 116 more intuitive.

In this example, the mapping module 28 displays the markers 104-108 in the disambiguation menu 116 as large open circles to allow easy viewing and selection by the user 114. The spread out markers 104-108 also are annotated with the names of the restaurants to provide the user 114 with additional information. Thus, the disambiguation menu 116 provides further information about the locations corresponding to the markers 104-108 in addition to disambiguation of these markers. In general, however, the mapping module 28 may display the disambiguation menu 116 in any suitable manner: using the "original" symbols for markers 104-108 as illustrated in FIG. 2A, using text-only labels, etc.

Figure 2C:
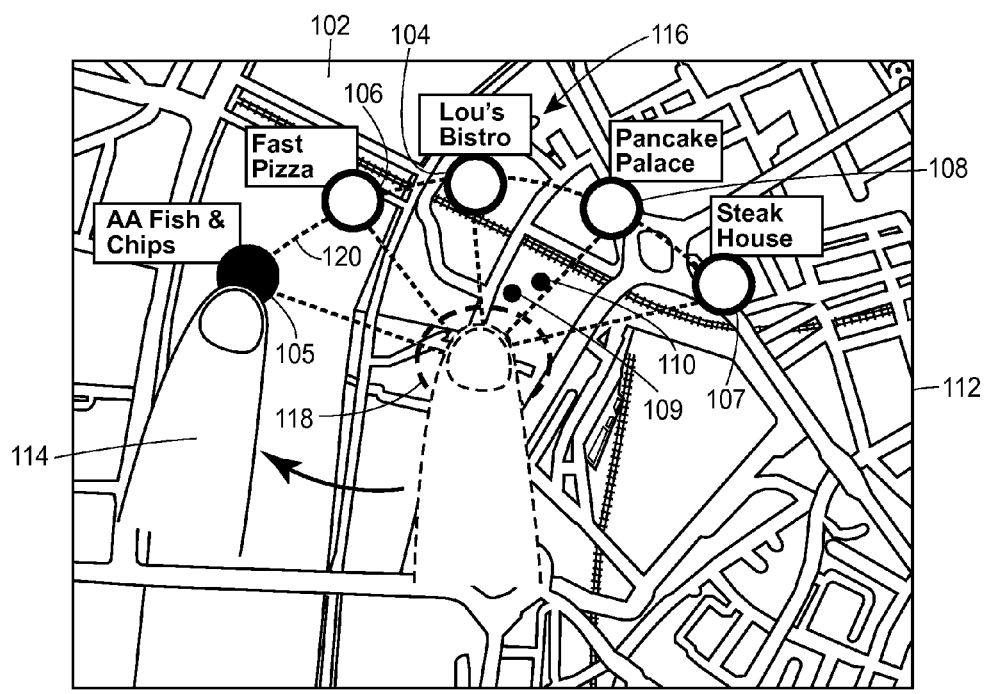
FIG. 2C is an example screenshot which the mapping module can generate to confirm the selection of one of the displayed markers via the disambiguation menu of FIG. 2B.

In one example implementation, the user applies a long-press gesture to the contact area with multiple markers, and the mapping module 28 brings up the disambiguation menu 116 while the user's finger is still on the touchscreen. The user then slides her finger to one of the markers on the arc 120, as illustrated in FIG. 2C, and lifts the finger to indicate the selection. If the user does not see the desired result in the disambiguation menu 116, the user can lift her finger off the touchscreen 112 to cause to the mapping module 28 to remove the disambiguation menu 116 (and register no selection). In other implementations, to specify the selection of one of the markers 104-108 in the disambiguation menu 116, the user 114 can tap on the selection, double-tap on the selection, etc. Further, in some implementations and/or scenarios, the disambiguation menu 116 also includes "normal" actions in addition to disambiguation functionality. In these cases, once the mapping module 28 brings up the disambiguation menu 116, the user can access various functions related to the markers 104-108 via the disambiguation menu 116.

In some implementations, when the disambiguation menu 116 is active, other interactions with the map are temporarily suspended, and the user can only select markers from among the markers on the arc 120. Markers or other controls outside disambiguation menu 116 will not respond to contact.

As illustrated in FIG. 2C, the mapping module 28 can visually confirm the selection of the marker via the disambiguation menu 116 by temporarily displaying the selected item as a large solid circle. Additionally or alternatively, the selection of a marker via the disambiguation menu 116 may bring up another menu or a pop-up informational window to provide additional information about the marker, for example.

It is noted that the disambiguation menu 116 in general need not be arcuate. Thus, in other implementations, markers can be arranged in a straight line, for example.

When the user places his finger on an area near the edge of the touchscreen 112 to select markers, the mapping module 28 generates the disambiguation menu and may tilt the arc so that the spread-out markers are displayed in an open area of the touchscreen 112 for unobstructed viewing.

Figure 3A:
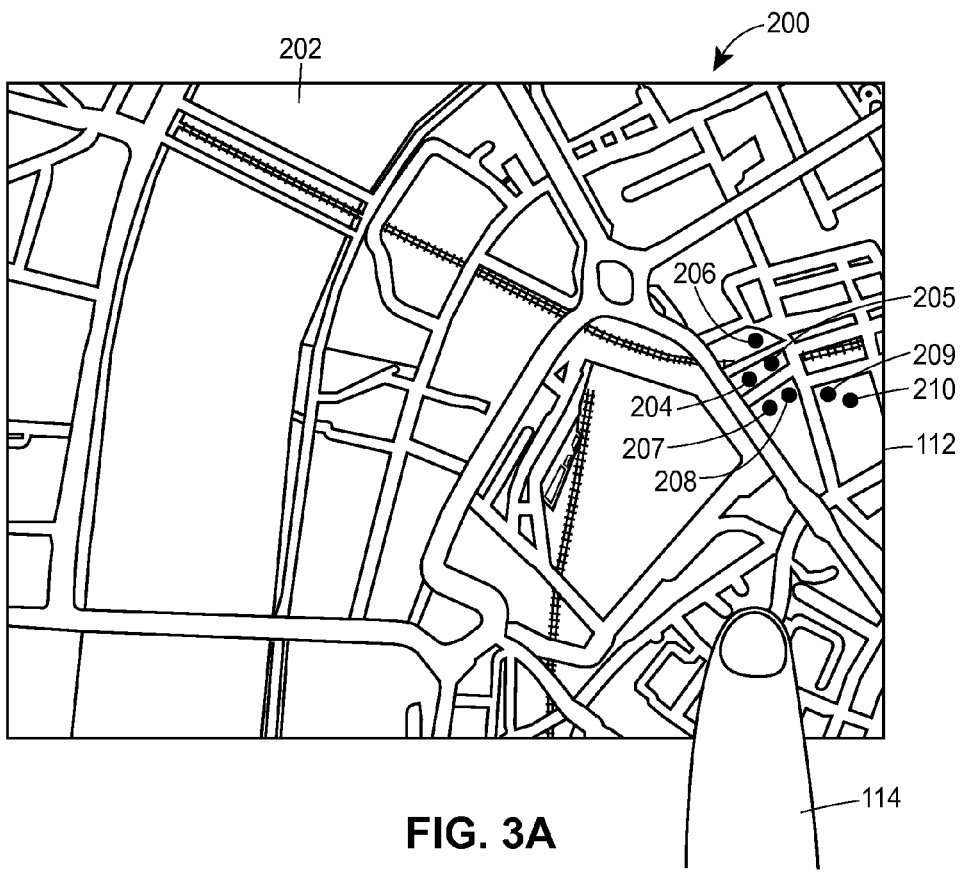
FIG. 3A is an example screenshot which the mapping module can generate to display makers positioned closely together at the edge of a screen.
Figure 3B:
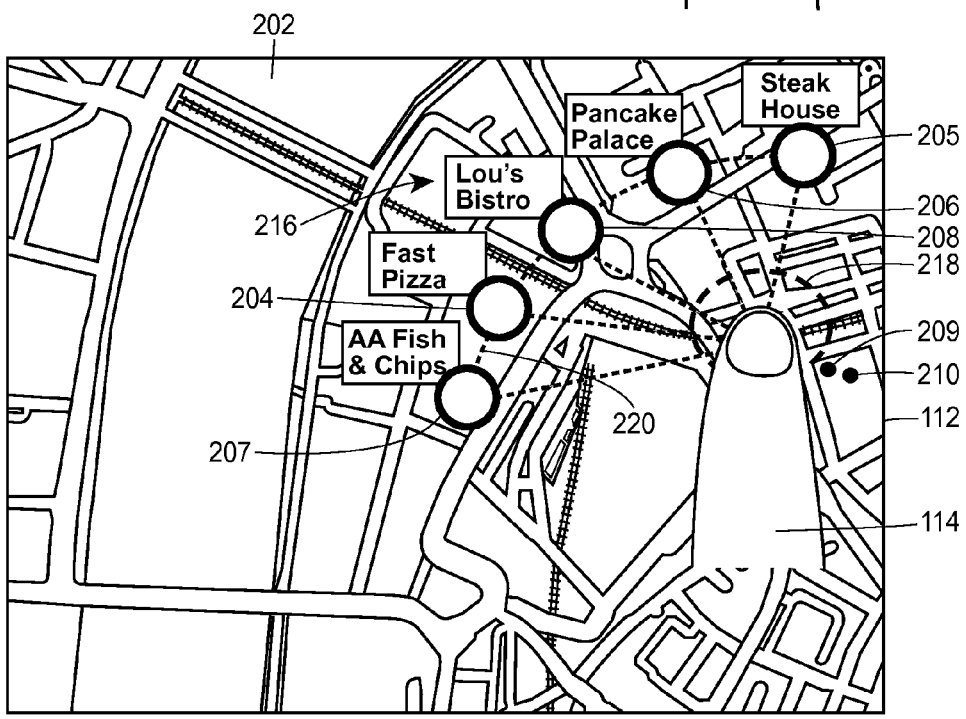
FIG. 3B is an example screenshot which the mapping module can generate to display a disambiguation menu for which selecting one of markers of FIG. 3A.

In particular, as illustrated in FIG. 3A, the mapping module 28 displays the markers 204-210 as small solid circles positioned closely together near the right-side edge of the touchscreen 112. The markers 204-210 are generally similar to the markers 104-110 in FIG. 2A. When the user attempts to select a marker among the markers 204-210 by placing her finger on the area where the markers 204-210 are displayed, the mapping module 28 generates a disambiguation menu 216. As illustrated in FIG. 3B, the mapping module 28 tilts the arc 210 to the left such that the spread out markers 204-208 are displayed in an open area of the touchscreen 112 to give an unobstructed view. The user now can make a selection of the spread-out markers 204-208 by sliding her finger along the arc 220 to the desired marker, or in another suitable manner.

Figure 4:
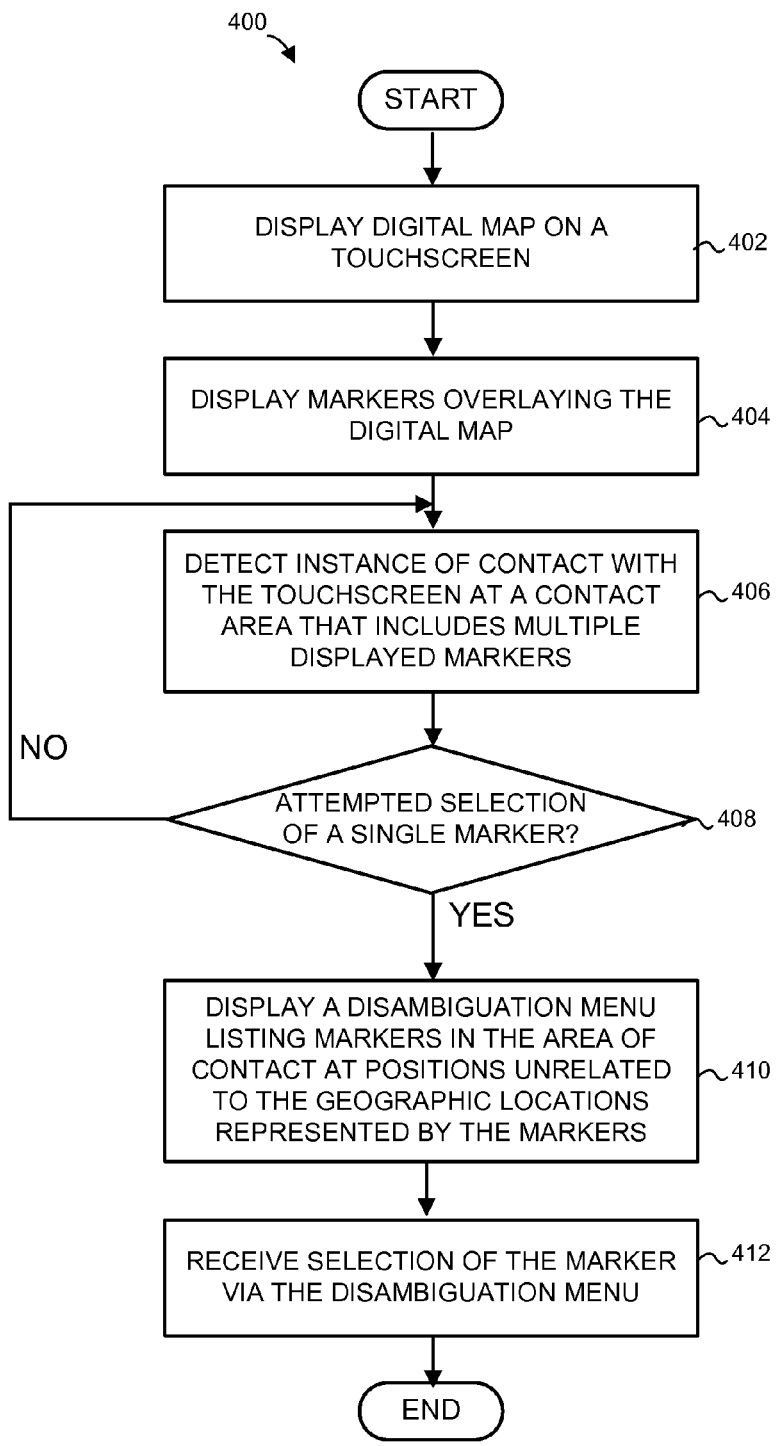
FIG. 4 is a flow diagram of an example method for disambiguating selections of markers in a mapping module.

To further illustrate the techniques for providing a user interface for disambiguating selections of markers, an example method which a mapping software module operating on a computing device may implement is discussed next with reference to FIG. 4. In an example implementation, the method of FIG. 4 is implemented in the mapping software module 28 executing on the computing device 12. More generally, however, the method can be implemented in any suitable software application or module, and can be implemented as sets of instructions stored on a computer-readable medium and executable on one or more processors.

The flow diagram of FIG. 4 illustrates an example method 400 for providing a user interface for disambiguating selections of markers on a map. At block 402, a digital map for a specified geographic area is displayed on a touchscreen of a computing device. Next, at block 404, individually selectable markers are displayed on the map. In some scenarios, the markers indicate the results of a geographical search query submitted by the user. In other scenarios, the markers are interactive icons displayed as part of a digital map or as a "layer" of information displayed on top of a digital map (e.g., the transit information layer displayed over a basic map, with markers indicating bus stops, subway stops, etc.).

Next, at block 406, an instance of user contact over a contact area on the touchscreen is detected. The contact area is an area on the map that includes several of the displayed markers. At block 408, the method 400 determines whether the instance of user contact indicates an attempt by the user to select exactly one of the plurality of displayed markers. For example, the double tap gesture in some implementations is mapped to a zoom-in function, while the long press gesture is mapped to the marker selection function. If the instance of user contact corresponds to an attempt by the user to select a marker, the flow proceeds to block 410. Otherwise, if the instance of user contact does not represent the attempt by the user to select a marker, the flow returns to block 406.

At block 410, a disambiguation menu is provided to allow the user to easily view and unambiguously select a marker from among the several markers in the contact area. The disambiguation menu is displayed with multiple markers, or indicators corresponding to the respective markers, in an area larger than the contact area. Further, the relative positions of these markers in the disambiguation menu are different than the relative positions of these markers on the map. For example, a first marker can be displayed to the left of the second marker because the first marker corresponds to a place that is West of the place to which the second marker corresponds. However, in the disambiguation menu, the second marker can be displayed to the left of the first marker if the second marker is more likely to be selected by the user. Also, as discussed above, the markers in the disambiguation menu may be annotated with text to provide additional information to the user.

At block 412, the user selects one of the markers via the disambiguation menu. The user may enter the selection via a tap, for example, or in any other suitable manner.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for disambiguating user selection of markers on a digital map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for disambiguating selections of selectable items geographic markers via a user interface, the method comprising:
   providing a digital map via the user interface;
   providing a plurality of individually selectable geographic markers, each overlaying the digital map at a respective point corresponding to a geographic location with which the geographic marker is associated;
   detecting a contact of a user with an area on the user interface in which several of the plurality of individually selectable geographic markers are provided according to a first relative arrangement;
   determining that the contact corresponds to an attempted selection of a single geographic marker;
   providing a disambiguation menu while the user maintains contact with the area for selecting the single geographic marker from among the several individually selectable geographic markers within the area, including arranging the several individually selectable geographic markers in the disambiguation menu according to a second relative arrangement different from the first relative arrangement; and
   determining which of the several individually selectable geographic markers has been selected when the user discontinues contact with the area.

2. The method of claim 1, wherein the geographic markers indicate respective results of a geographic search query.

3. The method of claim 1, wherein arranging the several individually selectable geographic markers in the disambiguation menu according to the second relative arrangement includes positioning the several individually selectable geographic markers along an arc centered approximately at the center of the area with which the contact was detected.

4. The method of claim 3, wherein positioning the several individually selectable geographic markers along the arc includes arranging the several individually selectable geographic markers from left to right in a decreasing order of at least one of (i) relevance or (ii) popularity of the corresponding geographic locations.

5. The method of claim 1, wherein arranging the several individually selectable geographic markers in the disambiguation menu further includes selectively highlighting one or more of the several individually selectable geographic markers according to at least one of (i) relevance or (ii) popularity of the corresponding geographic locations.

6. The method of claim 1, further comprising ignoring user interactions with the digital map while the disambiguation menu is active.

7. The method of claim 1, wherein providing the disambiguation menu further includes provides annotating the several individually selectable geographic markers with additional text.

8. The method of claim 1, wherein:
   the user interface includes a touchscreen,
   detecting the contact with the area includes detecting a long-press event.

9. A computing device comprising:
   one or more processors;
   a user interface; and
   a computer-readable medium storing thereon instructions that, when executed on one or more processors, cause the computing device to:
      display a digital map via the user interface,
      display selectable geographic markers overlaid on the digital map at points corresponding to geographic locations with which the geographic markers are associated,
      detect an attempted selection of one of the plurality of geographic markers via the user interface, including detect an interaction with a contact area in which the plurality of selectable geographic markers are displayed,
      automatically spread the plurality of selectable geographic markers over an area on the touch interface larger than the contact area, including change a position of at least one of the plurality of selectable geographic markers relative to the other ones of the plurality of selectable geographic markers,
      receive a selection of one of the plurality of selectable geographic markers via the user interface, and
      after the selection is received, restore the plurality of selectable geographic markers to the points on the corresponding to the geographic locations with which the geographic markers are associated.

10. The computing device of claim 9, wherein to spread the plurality of selectable geographic markers over the larger area, the instructions further cause the computing device to:
   position the plurality of selectable geographic markers along an arc centered approximately at the center of the contact area.

11. The computing device of claim 10, wherein to position the plurality of selectable geographic markers along the arc, the instructions further cause the computing device to:
   arrange the plurality of selectable geographic markers from left to right in a decreasing order of at least one of (i) relevance or (ii) popularity.

12. The computing device of claim 10, wherein the instructions further cause the computing device to annotate the plurality of selectable geographic markers spread over the larger area.

13. The computing device of claim 9, wherein the user interface is a touch interface.

14. A method in a computing device having a touchscreen for disambiguating selections of markers overlaying a digital map of a geographic area, the method comprising:
   causing individually selectable geographic markers to be displayed over the digital map, wherein each geographic marker is associated with a respective location within the geographic area, and wherein each geographic marker is displayed at a point on the digital map corresponding to the location with which the geographic marker is associated;

detecting an instance of user contact with the touchscreen at a contact area that includes a plurality of the displayed geographic markers;

determining that the instance of user contact indicates an attempted selection of exactly one of the plurality of geographic markers;

automatically providing, via the touchscreen, a disambiguation menu for selecting a geographic marker from among the plurality of the geographic markers included in the contact area, including:

causing a plurality of indicators corresponding to the respective ones of the plurality of geographic markers to be displayed over the digital map in an area larger than the contact area, at points different that the points at which the plurality of the geographic markers are displayed;

and the method further comprising:

receiving a selection of one of the plurality of geographic markers via the disambiguation menu.

15. The method of claim 14, further comprising ignoring user interactions with the digital map while the disambiguation menu is active.

16. The method of claim 14, wherein causing the plurality of indicators corresponding to the respective ones of the plurality of geographic markers to be displayed over the digital map in the area larger than the contact area includes:

positioning the plurality of indicators along an arc centered approximately at the center of the contact area.

17. The method of claim 16, wherein positioning the plurality of indicators along the arc includes arranging the plurality of indicators from left to right in a decreasing order of at least one of (i) relevance or (ii) popularity of the corresponding geographic locations.

18. The method of claim 14, further comprising annotating the plurality of indicators with text.

19. A non-transitory computer-readable medium storing thereon a plurality of instructions that, when executed on one or more processors of a computing device having a user interface, cause the one or more processors to:

provide a plurality of individually selectable geographic markers via the user interface over a digital map, each overlaying the digital map at a respective point corresponding to a geographic location with which the geographic marker is associated;

detect an attempted selection of a target geographic marker from among the plurality of individually selectable geographic markers via the user interface, wherein the target geographic marker cannot be identified based on the attempted selection; and provide a disambiguation menu for selecting the target geographic marker from among the plurality of individually selectable geographic markers, including:

arrange the geographic markers in the disambiguation menu according to a relative arrangement different from an original relative arrangement of the geographic markers, receive an unambiguous selection of the target geographic marker via the disambiguation menu, and remove the disambiguation menu upon receiving the unambiguous selection.

20. The non-transitory computer-readable medium of claim 19, wherein the instructions further cause the one or more processors to:

subsequently to receiving the selection, arrange the geographic markers according to the original relative arrangement.

21. The non-transitory computer-readable medium of claim 19, wherein to detect the attempted selection of the target geographic marker, the instructions cause the one or more processors to detect a contact with an area on the user interface in which the plurality of individually selectable geographic markers are provided.

22. The non-transitory computer-readable medium of claim 21, wherein the instructions cause the one or more processors to position the individually selectable geographic markers in the disambiguation menu along an arc centered approximately at the center of the area with which the contact was detected.

* * * * *